(12) United States Patent
Burkhard et al.

(10) Patent No.: US 8,695,336 B2
(45) Date of Patent: Apr. 15, 2014

(54) EXHAUST GAS WASTE GATE SYSTEM WITH CHARGE PRESSURE CONTROL

(75) Inventors: Sascha Burkhard, Kiel (DE); Wolfgang Heintze, Kronshagen (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 806 days.

(21) Appl. No.: 12/314,134

(22) Filed: Dec. 4, 2008

(65) Prior Publication Data

US 2009/0145125 A1     Jun. 11, 2009

(30) Foreign Application Priority Data

Dec. 4, 2007  (EP) .................................... 07122235

(51) Int. Cl.
*F02B 37/18*     (2006.01)

(52) U.S. Cl.
USPC ......................................................... 60/602

(58) Field of Classification Search
USPC .......... 60/600, 602, 603, 612, 280; 92/49, 36; 91/196
See application file for complete search history.

(56) References Cited

U.S. PATENT DOCUMENTS

| | | | |
|---|---|---|---|
| 3,257,796 A | 6/1966 | Updike | |
| 3,941,035 A | 3/1976 | Mueller | |
| 4,248,047 A * | 2/1981 | Sumi | 60/602 |
| 4,283,912 A * | 8/1981 | Cholvin | 60/602 |
| 4,471,616 A * | 9/1984 | Boudy | 60/611 |
| 4,528,815 A * | 7/1985 | Arnaud | 60/600 |
| 5,063,744 A * | 11/1991 | Ishiyama et al. | 60/600 |
| 6,295,814 B1 * | 10/2001 | Schmidt et al. | 60/602 |
| 6,405,535 B1 * | 6/2002 | McEwan | 60/602 |

(Continued)

FOREIGN PATENT DOCUMENTS

| | | |
|---|---|---|
| DE | 1 273 264 B | 7/1968 |
| EP | 0 869 275 A1 | 10/1998 |

(Continued)

OTHER PUBLICATIONS

European Search Report and European Search Opinion included in an EPO communication dated May 26, 2008, in corresponding EP Application No. 07122235.0 (7 pages).
European Search Report and European Search Opinion included in an EPO communication dated Mar. 28, 2011, in corresponding EP Application No. 10195329.7 (6 pages).

*Primary Examiner* — Thomas Denion
*Assistant Examiner* — Jessica Kebea
(74) *Attorney, Agent, or Firm* — Finnegan, Henderson, Farabow, Garrett & Dunner LLP

(57) ABSTRACT

In one aspect, an internal combustion engine may include at least one turbocharger having an exhaust gas inlet and a turbine. An exhaust gas channel may be connected to the exhaust gas inlet of the turbocharger. In the exhaust gas system a valve may be provided that has a valve member. The valve may regulate exhaust gas directed to the turbine. The valve position may be controlled in response to a characteristic indicative of charge pressure of combustion air. In another aspect, a method may be provided for regulating the pressure of charged air delivered by a turbocharger of an internal combustion engine. The method may include regulating the exhaust gas that is directed to the turbine of the turbocharger in response to a characteristic indicative of a charge pressure of charged combustion air. In another aspect, a valve for regulating exhaust gas directed to the turbine may be provided.

28 Claims, 7 Drawing Sheets

(56) References Cited

U.S. PATENT DOCUMENTS

| | | |
|---|---|---|
| 7,343,908 B2* | 3/2008 | Lohmann ............... 123/568.15 |
| 7,481,056 B2* | 1/2009 | Blaylock et al. ............... 60/602 |
| 2002/0088225 A1* | 7/2002 | Koch et al. ............... 60/602 |
| 2003/0074898 A1* | 4/2003 | McEwen et al. ............... 60/602 |
| 2003/0213244 A1* | 11/2003 | Faletti ............... 60/612 |
| 2006/0064980 A1* | 3/2006 | Ivens et al. ............... 60/602 |
| 2007/0204617 A1 | 9/2007 | Sterner et al. |
| 2007/0227142 A1 | 10/2007 | Blaylock et al. |

FOREIGN PATENT DOCUMENTS

| | | |
|---|---|---|
| EP | 1 830 050 A2 | 9/2007 |
| FR | 1 337 654 A | 8/1963 |
| FR | 2 782 746 A | 9/1998 |
| JP | 61-058923 A | 3/1986 |
| WO | 00/12883 A1 | 3/2000 |

* cited by examiner

EXHAUST GAS WASTE GATE SYSTEM WITH CHARGE PRESSURE CONTROL

This application claims the priority benefit of European Patent Application No. 07122235.0, filed Dec. 4, 2007.

TECHNICAL FIELD

The disclosure relates to an exhaust gas waste gate system with charge pressure control.

BACKGROUND

Internal combustion engines having a turbocharger are generally known. In EP-A-0 869 275 it is disclosed that a useful technique in the control and reduction of undesirable emissions from internal combustion engines is the use of pressure-charged intake air. This may permit the use of relatively smaller cubic displacement and lighter weight internal combustion engines, reducing in turn the specific fuel consumption and overall mass of the machine to perform a given function. In addition to the benefits of reduced size and mass, the typical pressure-charging device may be controlled to provide improved emissions characteristics. Pressure-charging machines suitable for such applications may include an exhaust gas driven turbocharger that may typically include an exhaust gas driven turbine linked to a compressor disposed in the intake air stream to provide pressure charged combustion air. The typical turbocharger may be controlled by providing a waste gate valve that may control the exhaust gas flow and gates exhaust gas to bypass the exhaust gas turbine and control the charging rate of the turbocharger so that the maximum pressure limits of the associated internal combustion engine are not exceeded. EP-A-0 869 275 does not disclose how the waste gate exhaust valve operates.

A disadvantage of known valves for controlling the exhaust gas flow to the turbocharger is that they are vulnerable to dirt. Especially, in applications in which the fuel used in the internal combustion engine is not very clean, for example in crude oil or heavy fuel applications, contamination of the known valve may lead to malfunctioning of the valve and, consequently, to damage of the internal combustion engine by overload. No waste gate valves are known by us for use in conjunction with large Diesel engines having medium rotating speed, for example 400-1200 rpm, and burning crude oil and heavy fuel. Such engines may have piston diameters in the range of 200 mm to more than 600 mm and may range in power from, for example, 1000 kW to 16000 kW.

Another disadvantage of known valves for controlling the exhaust gas flow to the turbocharger is that the parameter by which they are controlled is the exhaust gas pressure. Consequently, the control arrangements of the valve are likely to be contaminated by the hot exhaust gas. In view thereof, the durability of the known exhaust gas regulating valves is limited.

Additionally, known waste gate valves may, in general, not be able to adjust the amount of exhaust gas that may be diverted away from the turbocharger. In most cases, the known waste valve arrangements are either opened or closed. Known valves do not provide more than one control range. The outside air temperature and the outside air pressure may have a large influence on the charge pressure. Known exhaust valve arrangements do not take account of varying outside temperatures and pressures. Known waste gate valves are dedicated devices, having a specific application range that can not be varied easily. Because the control assemblies of the known valves are in contact with exhaust gas, those parts should be able to withstand extreme heat. Consequently, the known waste gate valves are expensive.

The current disclosure aims to alleviate or overcome these disadvantages associated with the prior art.

SUMMARY

In one aspect, an internal combustion engine may include at least one turbocharger having an exhaust gas inlet and a turbine. An exhaust gas channel may be connected to the exhaust gas inlet of the turbocharger. In the exhaust gas system a valve may be provided that has a valve member. The valve may be configured for regulating exhaust gas directed to the turbine. The valve position may be controlled in response to a characteristic indicative of charge pressure of combustion air.

In another aspect, a method may be provided for regulating the pressure of charged air delivered by a turbocharger of an internal combustion engine. The method may include feeding exhaust gas of the internal combustion engine to a turbine of the turbocharger and delivering charged combustion air on a super atmospheric pressure with the turbocharger. The method may further include regulating the exhaust gas that is directed to the turbine of the turbocharger in response to a characteristic indicative of a charge pressure of charged combustion air.

In another aspect, a valve may be provided including a valve member and a first control member operatively connected to the valve member via a valve spindle such that the position of the first control member may be correlated with the position of the valve member. The valve may include a first pressure chamber in which a gas may be contained that, in use, exerts a force on the first control member. At least one channel may be provided having an inlet that may be in fluid connection with the first pressure chamber and having an outlet that may be directed to at least one of the valve member and the valve spindle.

DETAILED DESCRIPTION

Figure 1:
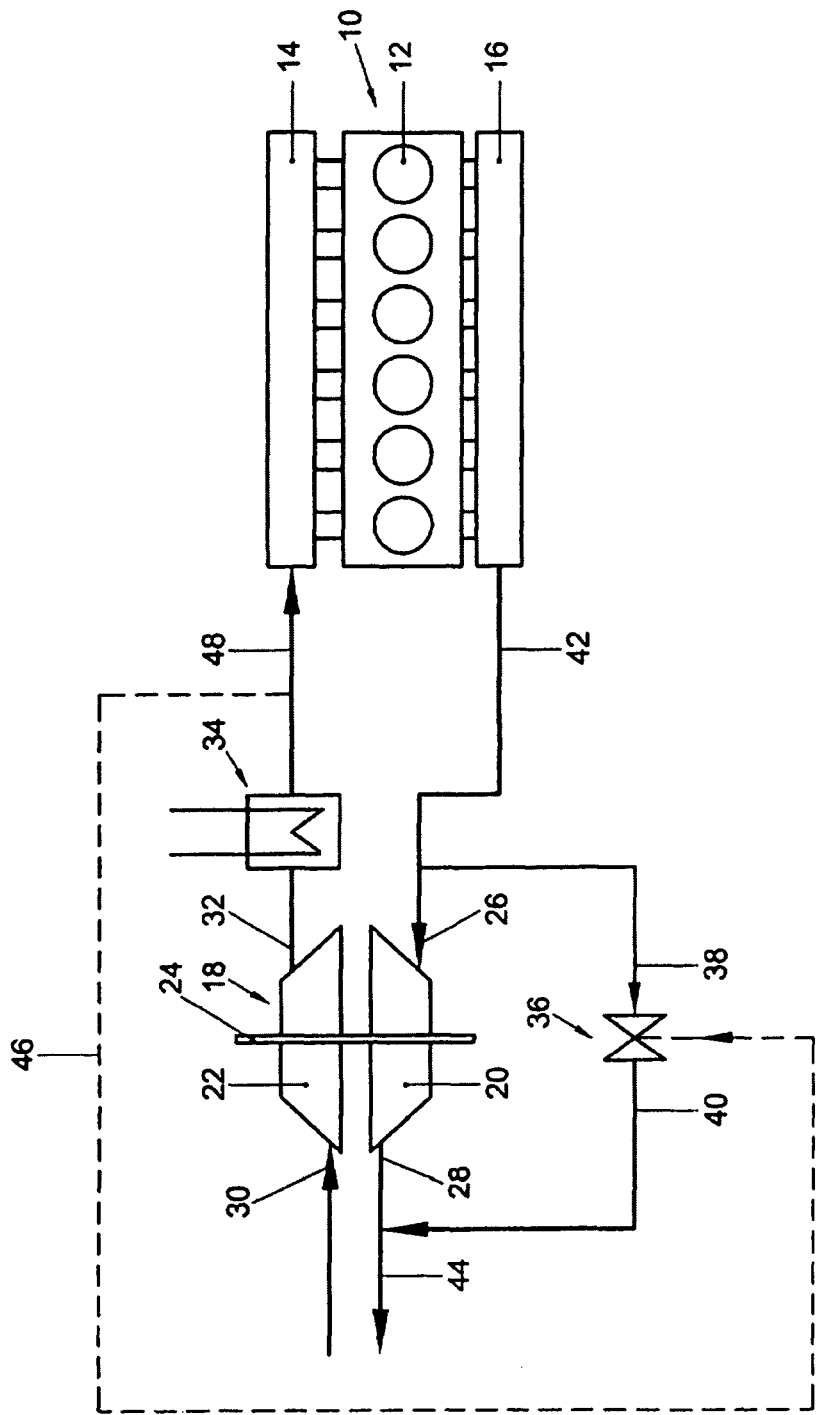
FIG. 1 is a schematic view of an internal combustion engine with a turbocharger.

Referring to FIG. 1, a schematic representation of a turbocharged internal combustion engine is depicted. The internal combustion engine 10 may have a number of cylinder chambers 12. Each cylinder chamber 12 may be filled with intake air and fuel so as to make the combustion process in the cylinder chamber possible. An intake manifold 14 may be provided for delivering intake air to the inlet ports of the cylinder chambers 12. Each cylinder chamber 12 may also be provided with at least one exhaust port which may be connected to an exhaust manifold 16. A turbocharger 18 may be provided for charging intake air at a super atmospheric pressure. The turbocharger 18 may have a turbine 20 and a compressor 22. The turbine 20 may drive the compressor 22, for example, via a shaft 24 that may connect the turbine 20 with the compressor 22. The turbocharger 18 may have an exhaust gas inlet 26 and an exhaust gas outlet 28 that are connected with a turbine space in which the turbine 20 is mounted. The turbocharger 18 may also have an air inlet 30 and an air outlet 32 that are connected to a compressor chamber in which the compressor 22 is mounted.

The air outlet 32 may be connected to the intake manifold 14 via an intake air channel 48 for delivering pressure charged intake air to the intake manifold 14. In the intake air channel 48 an aftercooler 34 may be present for cooling the pressure charged intake air before that air enters the cylinder chambers 12.

In some circumstances the amount of exhaust gas delivered to the turbine 20 may be too large. This may lead to a charge pressure of the intake air that is too high. Such circumstances may, for example occur when the outside temperature is relatively low. In order to be able to reduce the amount of exhaust gas delivered to the turbine 20, a valve 36 may be provided for regulating the exhaust gas directed to the turbine 20. Such a valve 36 may be a waste gate valve 36 that may have an inlet 38 that may be in fluid communication with an exhaust gas channel 42 upstream of the turbocharger 18. The valve 36 may also have a valve outlet 40 that may be in fluid communication with an exhaust gas system 44 downstream of the turbocharger 18. Although FIG. 1 indicates that the valve inlet 38 is connected to an exhaust gas channel 42 extending between the exhaust manifold 16 and the exhaust gas inlet 26 of the turbocharger 18, it may also be possible that the valve inlet 38 is directly connected to the exhaust gas manifold 16. The valve outlet 40 may, instead of being connected to exhaust gas system 44 of the combustion engine 10, also have its own exhaust gas outlet system.

The valve position of valve 36 may be controlled in response to a characteristic indicative of charge pressure of combustion air. This is indicated in FIG. 1 with the dotted charge pressure signal line 46. The charge pressure signal line 46 may be a conduit which may bring at least one chamber of the valve 36 in fluid communication with the charged intake air. In FIG. 1 charge pressure signal line 46 is connected to an intake air channel 48 extending between the air outlet 32 and the intake manifold 14, downstream of the aftercooler 34. It is also possible that the characteristic indicative of charge pressure of combustion air is taken from the intake manifold 14 or upstream of the aftercooler 34, for example, in the chamber containing the compressor 22 or in the channel extending between the air outlet 32 and the aftercooler 34. Instead of a conduit, the charge pressure signal line 46 may be a electrically conductive signal line. A pressure sensor may be provided for measuring the charged intake air pressure and a controller may be present to control the valve 36.

Figure 2:
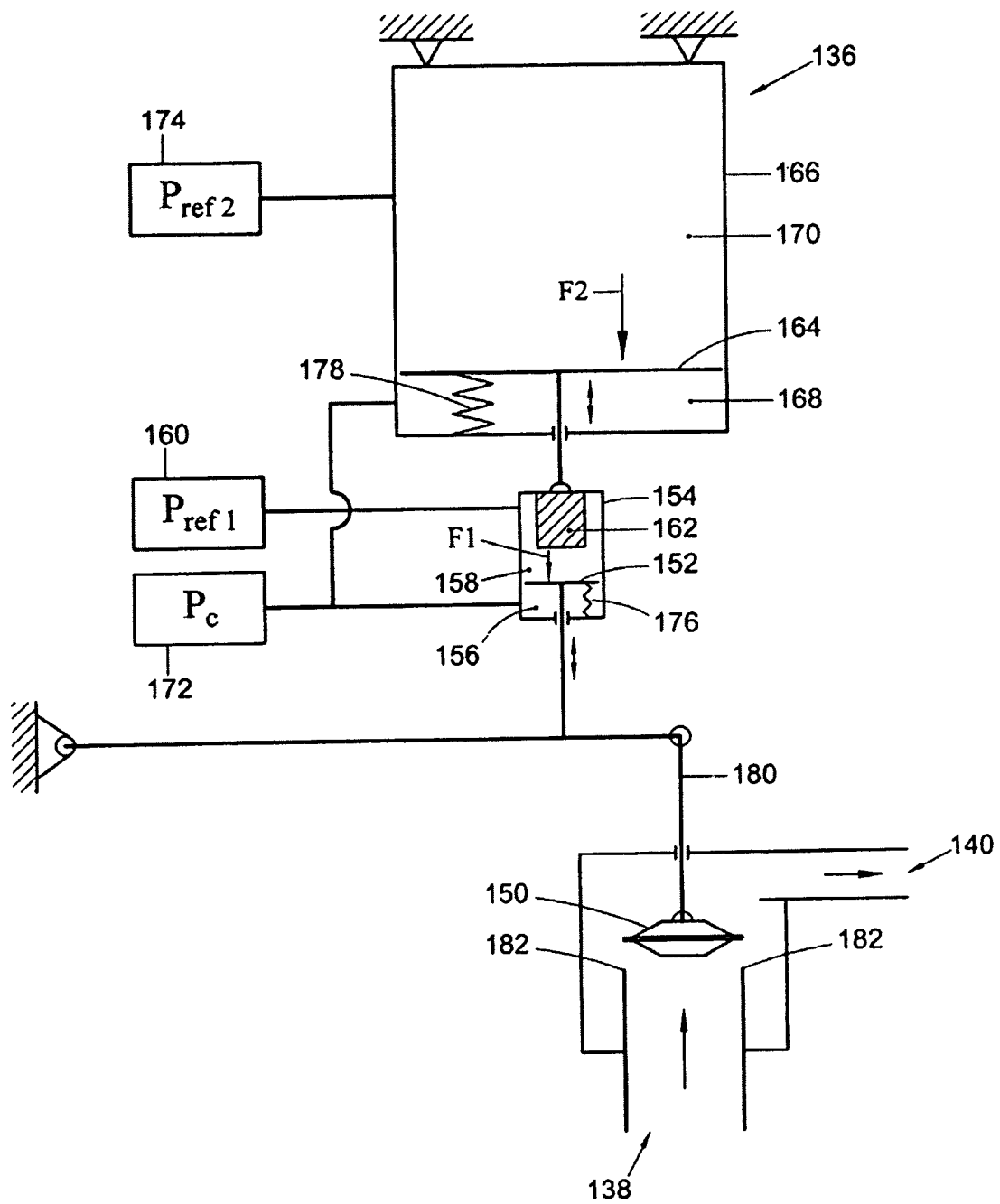
FIG. 2 is a schematic view of a first embodiment of a two stage waste gate valve.

FIG. 2 schematically shows an example of an embodiment of a valve that is configured for regulating exhaust gas directed to the turbine 20 of a turbocharger 18. As shown, the valve 136 may be a two-stage valve which may have an exhaust gas inlet 138 and an exhaust gas outlet 140 and a valve member 150. The valve member 150 may close off the exhaust inlet 138. The valve member 150 may be controlled by a first control member 152 that may be operatively connected to the valve member 150 such that the position of the first control member 152 may be correlated with the position of the valve member 150. The position of the first control member 152 may be at least partially dependent on at least a force exerted on the control member 152 by a gas 172 having a pressure that is indicative of a charge pressure of combustion air and by a first reference force F1 exerted on the control member 152. The first control member 152 may be a piston as shown in FIG. 2 which is moveable in a housing 154. The housing may have a chamber which may be divided by the first control member 152 into a first pressure chamber 156 and a second pressure chamber 158. The first pressure chamber 156 may be connected to charged intake air 172. Such a connection may be formed by a charge pressure signal line 46 as shown in FIG. 1. The second pressure chamber 158 may be connected to a pressure source 160 containing a gas having a reference pressure $P_{ref1}$ for providing the first reference force F1. A stroke of the first control member 152 may be limited by a stroke limiter 162 that may be settable in various positions.

The first housing 154 may be connected to a second control member 164. The second control member 164 may be a piston that is moveable in a second housing 166. The second control member 164 may divide a chamber inside the second housing 166 into a third pressure chamber 168 and a fourth pressure chamber 170. The third pressure chamber 168 may be connected to a source of charged intake air 172. Such a connection may, for example, be formed by a charge pressure signal line 46 as shown in FIG. 1. The fourth pressure chamber 170 may be connected to a second reference pressure source 174 containing a gas having a reference pressure $P_{ref2}$. The gas of the second reference pressure source may exert a second reference force F2 on the second control member 164. In addition to or instead of the reference pressure sources 160, 174, the first control member 152 may also be operatively connected with a first biasing member 176 that may exert a force on the first control member 152. Similarly, the second control member 164, may be operatively connected with a second biasing member 178, that may exert a force on the second control member 164. These forces may vary with the position of the respective control members 152, 164. Although in the embodiment shown in FIG. 2, the control members 152 and 164 are depicted as pistons, an alternative in the form of a membranes is also feasible.

Figure 3:
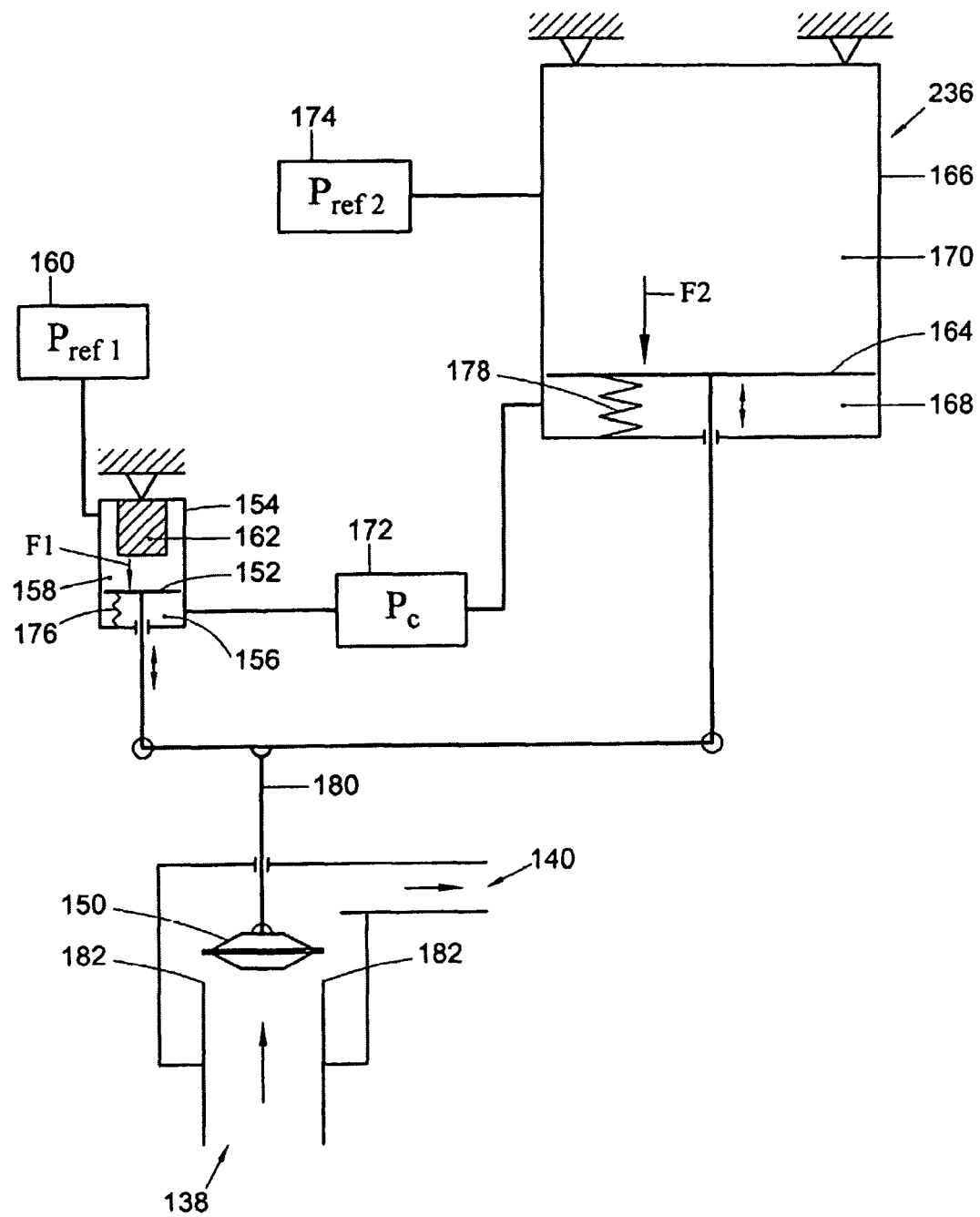
FIG. 3 is a schematic view of a second embodiment of a two stage waste gate valve.

FIG. 3 shows an alternative embodiment of a two-stage control valve 236. Whereas the embodiment shown in FIG. 2 has the two control members 152, 164 connected in series, the embodiment of FIG. 3 has the two control members 152, 164 connected in parallel. In FIG. 3 corresponding parts have corresponding reference numbers as used in the embodiment of FIG. 2.

Figure 4:
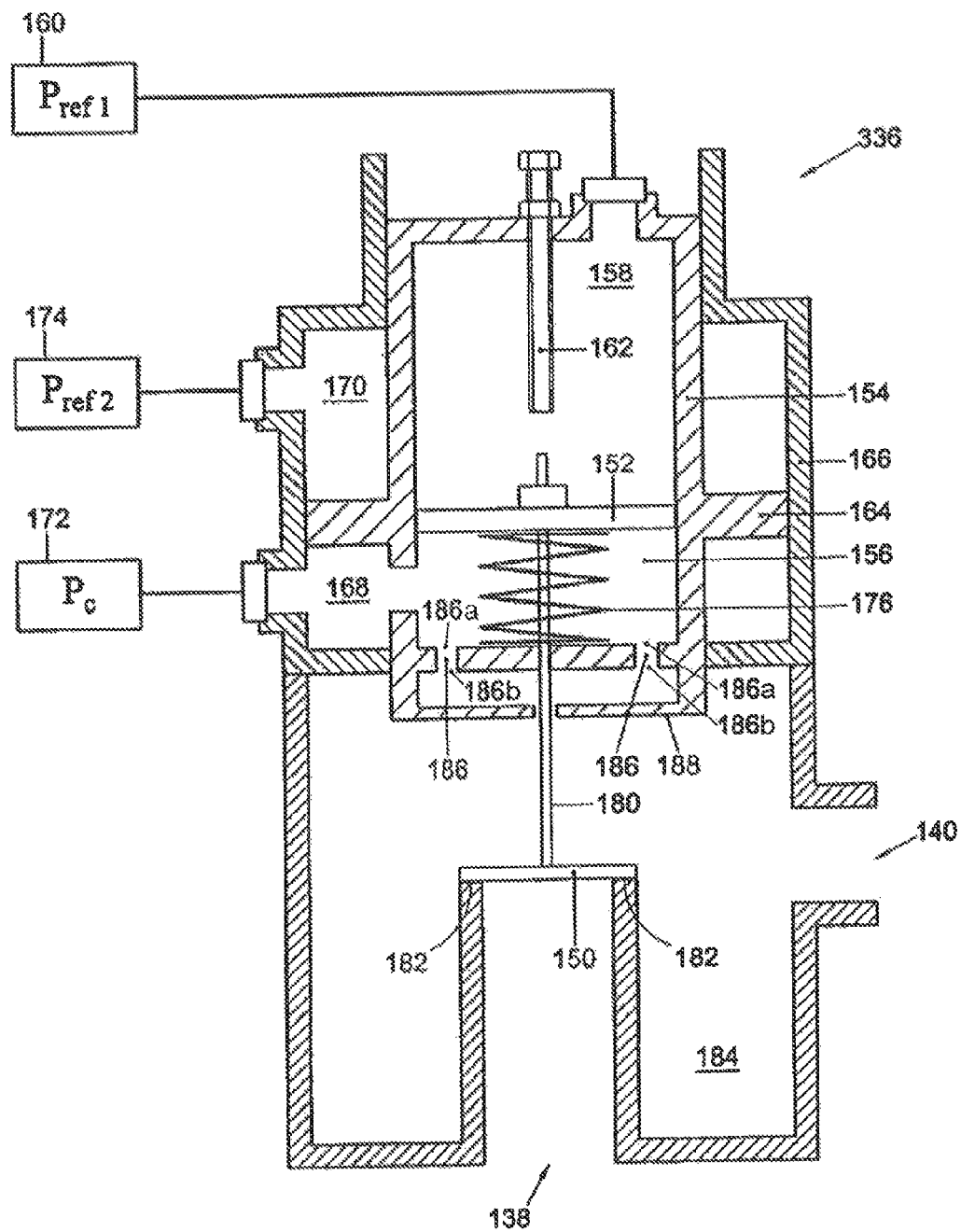
FIG. 4 is a schematic cross section of a third embodiment of a waste gate valve when the first and the second stage are closed.
Figure 5:
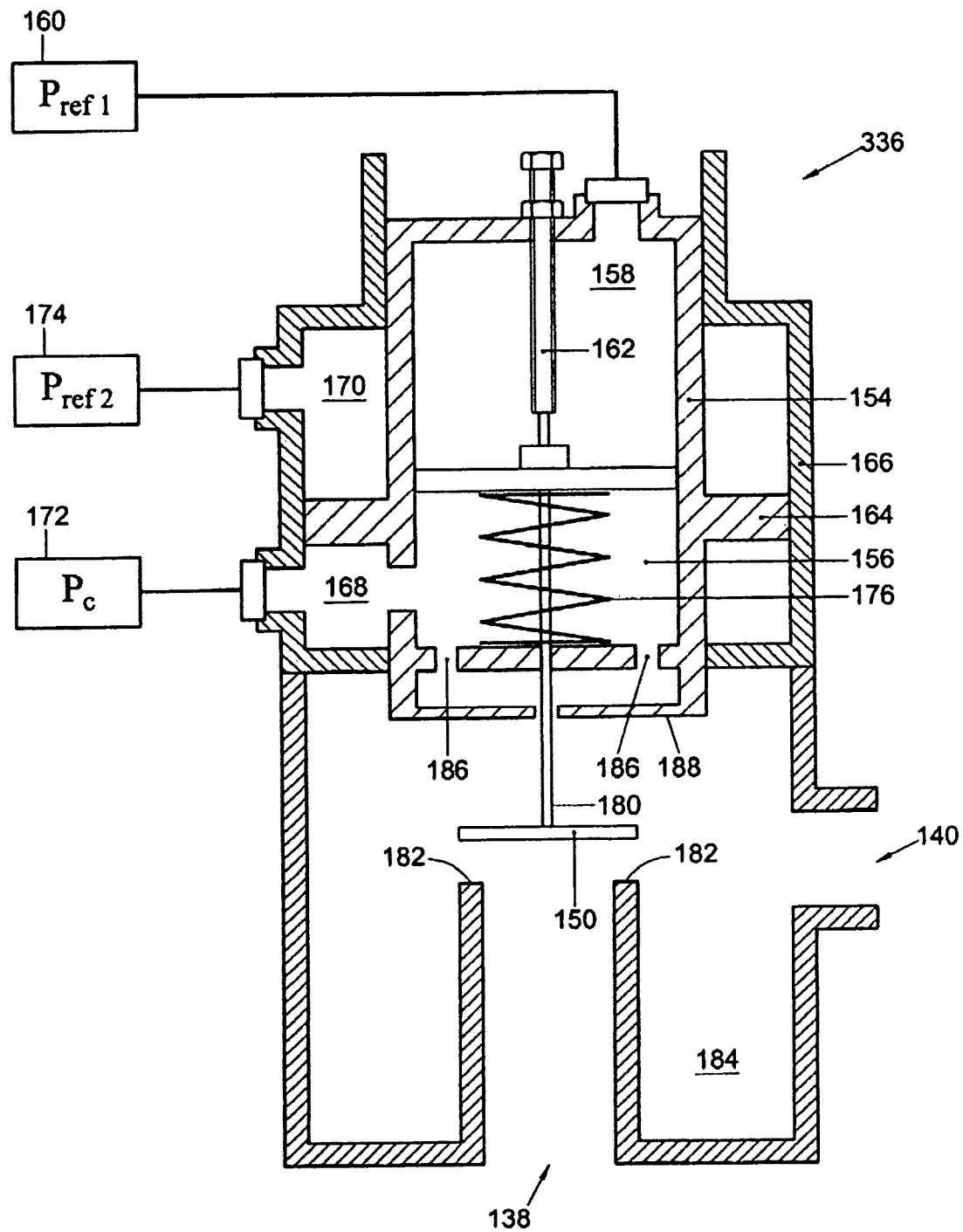
FIG. 5 is the same view as shown in FIG. 4 with the first stage of the waste gate valve opened.
Figure 6:
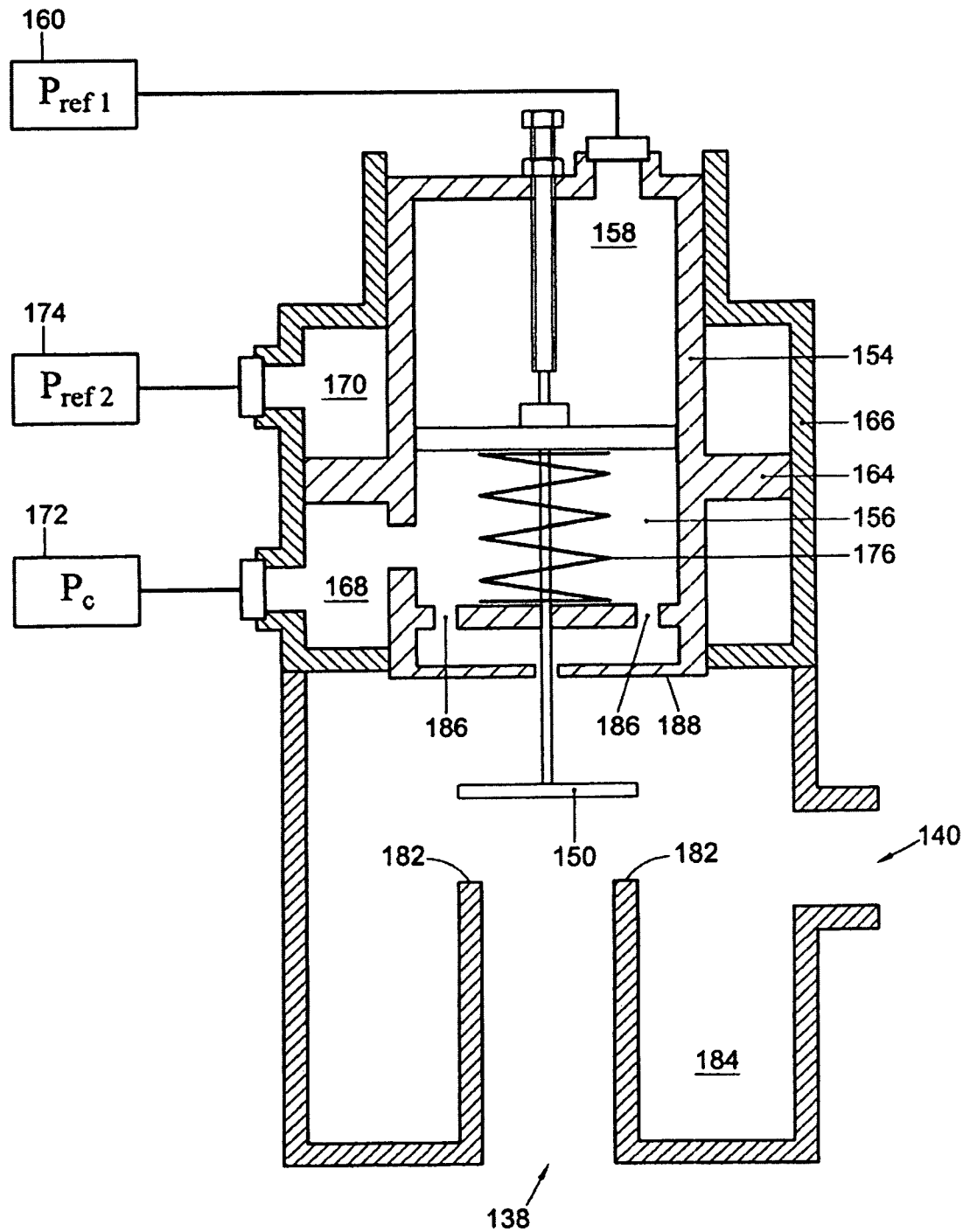
FIG. 6 is the same view as shown in FIG. 4 with the first and the second stage of the waste gate valve opened.

FIGS. 4-6 schematically shows a practical example of an embodiment of a valve 336 for regulating exhaust gas directed to the turbine 20 of the turbocharger 18. The practical embodiment shown in FIG. 4 may be a waste gate valve and is most comparable to the embodiment shown in FIG. 2 in that the first control member 152 is connected in series with a second control member 164. FIG. 4 shows the closed position, FIG. 5 shows an intermediate position, and FIG. 6 shows a fully opened position of the valve 336.

The first control member 152 may be moveable in a first housing 154. The first housing 154 may carry the second control member 164 and may be embodied as an inner housing. The first or inner housing 154 may be moveable inside a second or outer housing 166. The first housing 154 may include a chamber that may be divided by the first control member 152 in the first pressure chamber 156 and the second pressure chamber 158. The second housing or outer housing 166 may include a chamber that may be divided by the second control member 164 into a third pressure chamber 168 and a fourth pressure chamber 170. A first biasing member 176 may exert a force on the first control member 152. As shown in FIG. 4, the biasing member 176 may be a helical spring. It will be clear that other biasing members such as, for example, air springs, blade springs or the like are feasible. The first pressure chamber 156 and the third pressure chamber 168 may be connected to a source of pressure charged intake air 172. The second pressure chamber 158 may be connected to a first pressure source 160 containing a gas having a first reference pressure $P_{ref1}$. The fourth pressure chamber 170 may be connected to a second reference pressure source 174 that may contain a gas having a second reference pressure $P_{ref2}$. The embodiment shown in FIG. 4 may include a valve member 150 that may be connected to the first control member 152 via a valve spindle 180. The valve member 150 may cooperate with a valve seat 182 of the exhaust gas inlet 138. FIG. 4 also shows the exhaust gas outlet 140. The exhaust gas inlet 138 and the exhaust gas outlet 140 may be in communication with an exhaust chamber 184 of the valve 336. The valve member 150 and the valve seat 182 may be in cooperation for regulating exhaust gas which may be directed to the exhaust gas inlet 26 and the turbine 20 of the turbocharger 18 or for regulating exhaust gas that is diverted away from the exhaust gas inlet 26 and the turbine 20 of the turbocharger 18. In the latter case, the valve 336 has the function of a waste gate valve.

At least one channel 186 may be provided that may have an inlet 186a that may be in fluid communication with a source of pressure charged intake air 172. The channels 186 may have an outlet 186b that may be directed to the valve member 150 and/or to the valve spindle 180. A baffle plate 188 may be provided to screen off the control member assemblies from the exhaust gas in the exhaust gas chamber 184. The channels 186 may for example be provided in the first housing 154 and the inlet 186a of the channels 186 may open into the first pressure chamber 156.

INDUSTRIAL APPLICABILITY

The exhaust gas waste gate system with charged pressure control may be applied in any internal combustion engine arrangement having an internal combustion engine 10 and a turbocharger 18. In accordance with one aspect, the method may include: (a) feeding exhaust gas of the internal combustion engine 10 to a turbine 20 of the turbocharger 18; (b) delivering charged combustion air on a super atmospheric pressure with the turbocharger 18; (c) regulating the exhaust gas that is directed to the turbine 20 of the turbocharger 18 in response to a characteristic indicative of charged pressure of charged combustion air.

Figure 7:
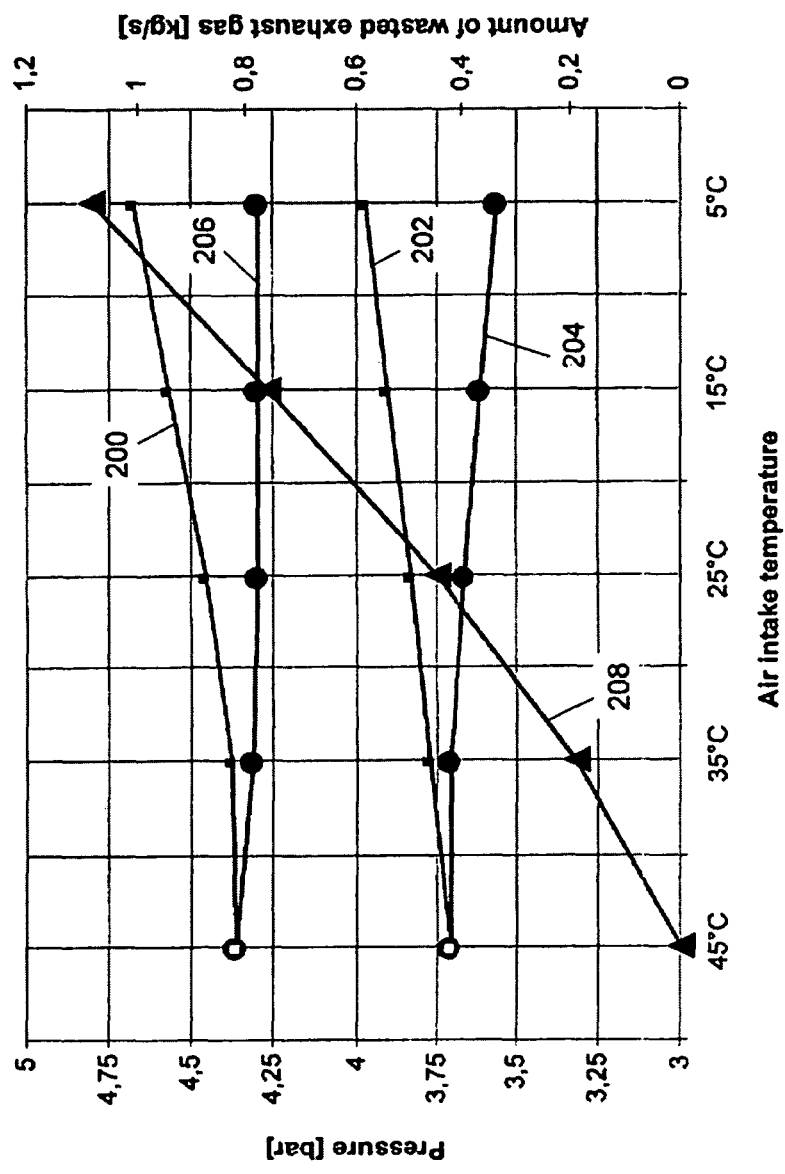
FIG. 7 is a diagram showing the relation between outside temperature and the charge pressure and the exhaust gas pressure as well as the amount of exhaust gas which is bypassed.

The diagram shown in FIG. 7 has on its horizontal axis the intake air temperature that, normally equals the temperature of the outside air which may be sucked in by the turbocharger 18. The left vertical axis indicates pressure and the right vertical axis indicates the amount of exhaust gas which is wasted in kilos per second. Curve 200 shows the relation between the compressed air pressure and the outside temperature without a waste gate valve 36. If no special measures are taken, the charge pressure of the intake air increase with a lowering outside temperature. Curve 202 shows the exhaust gas pressure upstream of the turbocharger 18 when no waste gate valve is present. Curve 204 shows the exhaust gas pressure upstream of the turbocharger 18 with a waste gate valve in accordance with an embodiment of the present disclosure. Curve 206 shows the pressure of the charged intake air with a waste gate valve of which the valve position may be controlled in response to a characteristic indicative of charge pressure of combustion air. Curve 208 shows the amount of exhaust gas which bypasses the turbocharger 18 when the waste gate valve 36 is operated.

By using a waste gate valve as described, the exhaust gas directed to the turbocharger 18 may be controlled. As a consequence, the charge pressure of charged intake air may be controlled so that outside temperature fluctuations may be compensated. To that end, the exhaust gas directed to the turbine 20 may be regulated in a first range of a characteristic indicative of charge pressure of charged combustion air. Additionally, the exhaust gas directed to the turbine 20 may be regulated in a second range of a characteristic indicative of charge pressure of charged combustion air. The first range of a characteristic indicative of charge pressure of charged combustion air may correspond to a first temperature range, for example, of outside air temperatures above approximately 25° C. The second range of a characteristic indicative of charge pressure of charged combustion air may correspond to a second temperature range, for example, outside air temperatures under approximately 25° C.

To that end a gas pressure indicative of charged pressure of combustion air may act on the first control member 152 for providing a first control range. The first control range may, for example, be active for outside temperatures above 25° C. Additionally a gas pressure indicative of a charged pressure of combustion air may act on the second control member 164 for providing a second control range. The second control range may, for example, be active for outside temperatures below 25° C. The first control range may encompass valve member 150 positions which may be varied by the movement of the first control member 152 and may be limited by the stroke limiter 162. The second control range may be determined by the possible movement of the second control member 164. FIG. 4 shows the embodiment of a waste gate valve 336 in the closed position. FIG. 5 shows the same embodiment in a semi-opened position, i.e. at the end of the first control range. As can be seen, the first control member 152 has reached its end position in that it hits stroke limiter 162. To further open valve member 150, the second control member 164 may move upwards. A fully opened position, which forms the end of the second control range of the waste gate valve 336, is shown in FIG. 6. The first control member 152 is still positioned against stroke limiter 162, whereas the second control member 164 has moved upward relative to the position shown in FIG. 5. The first reference pressure source 160 may be a gas bottle. The second referenced pressure source 174 may also be a gas bottle. In fact, even the same gas bottle may be used for the first and the second reference pressure sources 160, 174. In that case, the surface difference between the surface of the first control member 154 on which the reference gas acts and the surface of the first control member on which the gas pressure acts that is indicative of charged pressure of combustion air, may not be the same as the corresponding surface difference of the second control member 164. Consequently, the resulting forces exerted on the first control member 152 and the second control member 164 may be different and thus provide movement to the respective control members at different charge pressure values. Thus, different control ranges may be provided. Alternatively, two reduction valves may be provided reducing the single gas bottle pressure to different values, one producing the first reference pressure $P_{ref1}$ and the other producing the second reference pressure $P_{ref2}$.

Using constant gas pressures for the reference pressures may have the advantage that, when the control member is moved as a consequence of a varying charge pressure, the reverse force provided by the reference gas pressure may remain substantially constant. Conventional springs would provide an increasing force against continued movement of the control members. Such increasing force with continued movement might lead to fluctuations in the position of the control members. However the use of a combination of a reference pressure source and a biasing member or, alternatively, exclusively a biasing member such as a spring for counteracting the gas pressure indicative of charged air pressure may also be feasible.

By virtue of channels 186, the valve member 150 and/or valve spindle 180 may be flushed with charged air. Thus valve spindle 180 and valve member 150 may be cooled and flushed. By doing that, it may be prevented that exhaust gas enters the arrangement of the first and second control members 152, 164. The flushing and cooling increases the durability of the valve arrangement. The baffle 188 may further prevent clogging and ingress of dirt into the control member arrangement. The charged air that may flow out of the channels 186 may flow via a small opening in the baffle 188 through which the valve spindle 180 extends, into the exhaust gas chamber 184. This flow may prevent that exhaust gas reaches the control member arrangement. Especially in crude oil and heavy fuel applications, where control means within the exhaust path are easily jammed by dirt, the waste gate valve arrangement in accordance with the present disclosure may be highly durable.

The embodiment shown is robust. No electronic components for regulating the position of the valve member 150 need to be involved, although such electronic components are not excluded. The provision of a first control range which reaches its end position at relatively low charge pressures may avoid fluctuations of the valve member 150. Consequently, damage which may be caused to the valve member 150 and the valve seat 182 by such fluctuation or resonating may be minimized. The second control range may provide actual control of the amount of exhaust gas that may be diverted away from the turbocharger 18. Further, the waste gate valve may be self-regulating. The charge pressures at which the valve may open and the ranges of the first stage and the second stage may be varied very easily by varying the reference pressures $P_{ref1}$ and $P_{ref2}$ which act on the first and second control members 152, 164. Additionally, the spring constant of the biasing member or biasing members may be varied by exchanging biasing member for different applications. Thus, the same waste gate valve arrangement may be used for different internal combustion engines and different turbochargers 18 by just varying the reference pressures in the first and the second reference pressure source 160, 174 and/or by exchanging biasing members. The pressure at which the valve member 150 moves from its closed position to its first position may be adjusted more of less independent of the pressure of the exhaust gas entering the waste gate valve. Furthermore, the end of the first stage control range, i.e. an end position of the first control member 152, may be varied upon requirement by adjusting the position of the stroke limiter 162.

It will be apparent to those having ordinary skill in the art that various modifications and variations can be made to the disclosed exhaust gas waste gate system with charged pressure control. Other embodiments will be apparent to those having ordinary skill in the art from consideration of the specification. For example, the number of control members may be increased, thus providing an increased number of control ranges. This may lead to an even more sophisticated behavior of the valve, such that the charge pressure of the intake air may be kept at desired levels over a broader range of outside temperatures. It is intended that the specification and examples be considered as exemplary only. Other aspects, features and advantages will be apparent upon examination of the attached drawings and appended claims.

What is claimed is:

1. An internal combustion engine comprising:
   at least one turbocharger having an exhaust gas inlet, a compressor, and a turbine;
   an exhaust gas system having an exhaust gas channel which is connected to the exhaust gas inlet; and
   a valve in the exhaust gas system, a position of the valve being controlled in response to a characteristic indicative of a charge pressure of combustion air, the valve including:
   a valve member configured for regulating exhaust gas directed to the turbine,
   a first moveable control member operatively connected to the valve member such that a position of the first control member is correlated with a position of the valve member, the position of the first control member being at least partially dependent on at least a force exerted on the first control member by a gas having a pressure that is indicative of the charge pressure of combustion air and a first reference force exerted on the first control member so as to control the position of the valve in a first range of the characteristic indicative of the charge pressure of combustion air, the gas being supplied from downstream of the compressor, the first reference force being supplied by a first reference pressure source, and
   a second moveable control member operatively connected to the valve member such that a position of the second control member is correlated with the position of the valve member, the position of the second control member being at least partially dependent on at least a force exerted on the second control member by the gas having the pressure that is indicative of the charge pressure of combustion air and a second reference force exerted on the second control member so as to control the position of the valve in a second range of the characteristic indicative of the charge pressure of combustion air, the second reference force being supplied by a second reference pressure source;
   wherein the first reference pressure source is different the second reference pressure source, and
   wherein the first control member is directly coupled to the valve member via a valve spindle, the first control member is mounted in an inner housing, and the inner housing is directly connected with the second control member which is moveable in an outer housing.

2. The internal combustion engine according to claim 1, further including a first biasing member exerting a force on the first control member which force varies with the position of the first control member.

3. The internal combustion engine according to claim 2, wherein the first control member is chosen from the group consisting of a membrane and a piston.

4. The internal combustion engine according to claim 1, further including a second biasing member exerting a force on the second control member which force varies with the position of the second control member.

5. The internal combustion engine according to claim 1, wherein the second control member is chosen from the group consisting of a membrane and a piston.

6. The internal combustion engine according to claim 1, wherein the inner housing defines a first pressure chamber on one side of the first control member and a second pressure chamber on another side of the first control member, the first pressure chamber is connected to the charged combustion air, and the second pressure chamber is connected to the first reference pressure source.

7. The internal combustion engine according to claim 6, wherein the outer housing defines a third pressure chamber on one side of the second control member and a fourth pressure chamber on another side of the second control member, the third pressure chamber is connected to the charged combustion air, and the fourth pressure chamber is connected to the second reference pressure source.

8. The internal combustion engine according to claim 6, wherein at least one channel is provided having an inlet that is in fluid connection with a source of the charged combustion air delivered by the turbocharger and having an outlet that is directed to at least one of the valve member and the valve spindle.

9. The internal combustion engine according to claim 8, wherein the at least one channel is provided in the inner housing, the inlet of the channel opens into the first pressure chamber, and the outlet of the channel is directed to at least one of the valve member and the valve spindle.

10. The internal combustion engine according to claim 1, wherein the valve includes an exhaust gas chamber with an exhaust gas inlet and an exhaust gas outlet, the exhaust gas inlet of the valve is connected with the exhaust gas system upstream of the turbocharger, and the exhaust gas outlet is connected with the exhaust gas system downstream of the turbocharger.

11. The internal combustion engine according to claim 10, wherein the exhaust gas inlet of the valve is provided with a valve seat, and the valve member and the valve seat are in co-operation for regulating pressure of exhaust gas which is directed to the exhaust gas inlet of the turbocharger.

12. The internal combustion engine according to claim 1, wherein the first range and the second range are different.

13. The internal combustion engine according to claim 1, wherein the positions of the first control member and the second control member are correlated with the position of the valve member in the first and second ranges of the characteristic indicative of the charge pressure of combustion air.

14. A method for regulating a pressure of charged air delivered by a turbocharger of an internal combustion engine, the method comprising:
feeding exhaust gas of the internal combustion engine to a turbine of the turbocharger, the internal combustion engine including a valve including:
a valve member,
a first moveable control member operatively connected to the valve member such that a position of the first control member is correlated with a position of the valve member, the position of the first control member being at least partially dependent on at least a force exerted on the first control member by a gas having a pressure that is indicative of a charge pressure of combustion air and a first reference force exerted on the first control member so as to control the position of the valve in a first range of a characteristic indicative of the charge pressure of combustion air, the first reference force being supplied by a first reference pressure source, the first control member being directly coupled to the valve member via a valve spindle, and the first control member being mounted in an inner housing, and
a second moveable control member operatively connected to the valve member such that a position of the second control member is correlated with the position of the valve member, the position of the second control member being at least partially dependent on at least a force exerted on the second control member by the gas having the pressure that is indicative of the charge pressure of combustion air and a second reference force exerted on the second control member so as to control the position of the valve in a second range of the characteristic indicative of the charge pressure of combustion air, the second reference force being supplied by a second reference pressure source, wherein the first reference pressure source is different from the second reference pressure source, the inner housing being directly connected with the second control member which is moveable in an outer housing;
delivering the charged combustion air at a pressure above atmospheric pressure with the turbocharger; and
regulating the exhaust gas that is directed to the turbine of the turbocharger in response to the characteristic indicative of the charge pressure of the charged combustion air by:
regulating the exhaust gas directed to the turbine in the first range of the characteristic indicative of the charge pressure of the charged combustion air by exerting the force on the first control member by the charged combustion air delivered with the turbocharger, and
regulating the exhaust gas directed to the turbine in a second range of the characteristic indicative of the charge pressure of the charged combustion air by exerting the force on the second control member by the charged combustion air delivered with the turbocharger.

15. The method according to claim 14, further including:
exerting the first reference force on the first control member in an opposite direction of the charged combustion air.

16. The method according to claim 14, further including:
exerting the second reference force on the second control member in an opposite direction of the charged combustion air.

17. The method according to claim 14, further including:
acting with a biasing force on the first control member.

18. The method according to claim 14, further including:
acting with a biasing force on the second control member.

19. The method according to claim 14, further including:
directing a stream of the charged combustion air to the valve member.

20. The method according to claim 14, further including:
directing a stream of the charged combustion air to a valve spindle of the valve.

21. The method according to claim 20, further including:
diverting exhaust gas upstream from the turbocharger away from the turbocharger with the valve.

22. A valve configured to be provided in an exhaust gas system of an internal combustion engine, the valve including:
a valve member configured to regulate exhaust gas directed to a turbine of an exhaust gas channel of a turbocharger;
a first control member operatively connected to the valve member via a valve spindle such that a position of the first control member is correlated with a position of the valve member;
a first pressure chamber in which a gas may be contained that, in use, exerts a force on the first control member;
at least one channel having an inlet that is in fluid connection with the first pressure chamber and having an outlet that is directed to at least one of the valve member and the valve spindle so that the at least one channel is configured to allow fluid from the first pressure chamber to contact the at least one of the valve member and the valve spindle; and a second moveable control member operatively connected to the valve member such that a position of the second control member is correlated with the position of the valve member, the position of the second control member being at least partially dependent on at least a force exerted on the second control member, wherein the first control member is mounted in an inner housing, the inner housing is connected with the second control member which is moveable in an outer housing, the inner housing defines the first pressure chamber on one side of the first control member and a second pressure chamber on another side of the first control member, and the outer housing defines a third pressure chamber on one side of the second control member and a fourth pressure chamber on another side of the second control member.

23. The valve according to claim 22, further including a baffle plate situated between the valve member and the first control member, the baffle plate including an opening through which the valve spindle extends, the baffle plate being arranged to screen off the control member from a fluid flow that, in use, passes the valve member.

24. The valve according to claim 22, wherein the first pressure chamber is connected to a source of charged air, the second pressure chamber is connected to a first reference pressure source exerting a first reference force on the first control member, and the third pressure chamber is connected to the source of charged air, the fourth pressure chamber is connected to a second reference pressure source exerting a second reference force on the second control member.

25. The valve according to claim 22, wherein:

the position of the first control member at least partially depends on at least the force exerted on the first control member by the gas having a pressure that is indicative of a charge pressure of combustion air and a first reference force exerted on the first control member; and the position of the second control member depends on at least the force exerted on the second control member by the gas having the pressure that is indicative of the charge pressure of combustion air and a second reference force exerted on the second control member.

26. The valve according to claim 22, wherein the inlet of the at least one channel is in fluid connection with a source of charged air delivered by the turbocharger.

27. The valve according to claim 26, wherein the outlet of the at least one channel is configured to direct the charged air to the at least one of the valve member and the valve spindle to flush the at least one of the valve member and the valve spindle with the charged air.

28. The valve according to claim 22, wherein the at least one channel is configured to direct fluid from the first pressure chamber to the at least one of the valve member and the valve spindle.

* * * * *